United States Patent [19]
Sakai

[11] Patent Number: 6,113,650
[45] Date of Patent: Sep. 5, 2000

[54] COMPILER FOR OPTIMIZATION IN GENERATING INSTRUCTION SEQUENCE AND COMPILING METHOD

[75] Inventor: Junji Sakai, Tokyo, Japan

[73] Assignee: NEC Corporation, Tokyo, Japan

[21] Appl. No.: 09/108,387

[22] Filed: Jul. 1, 1998

[51] Int. Cl.[7] ..................................................... G06F 9/45
[52] U.S. Cl. .................. 717/6; 717/5; 717/9; 717/8; 712/22; 712/241; 712/300; 711/201
[58] Field of Search ................................. 395/705, 706, 395/707, 708, 709; 712/1, 2, 7, 9, 10, 14, 16, 22, 23, 24, 200, 203, 204, 205, 206, 214, 215, 241, 300; 711/170, 171, 200, 201, 212

[56] References Cited

U.S. PATENT DOCUMENTS

| | | | |
|---|---|---|---|
| 5,274,818 | 12/1993 | Vasilevsky et al. | 395/706 |
| 5,475,842 | 12/1995 | Gilbert et al. | 395/706 |
| 5,649,179 | 7/1997 | Steenstra | 412/248 |
| 5,696,956 | 12/1997 | Razdan et al. | 712/23 |
| 5,704,053 | 12/1997 | Santhanam | 712/207 |
| 5,819,064 | 10/1998 | Razdan | 395/500.48 |
| 5,889,985 | 3/1999 | Babaian et al. | 712/225 |
| 5,958,048 | 9/1999 | Babaian et al. | 712/241 |
| 5,995,122 | 11/1999 | Hsieh et al. | 345/523 |

OTHER PUBLICATIONS

Al–Mouhamed et al., "A compiler transformation to improve memory assess time in SIMD systems", Proc. of Parallel Architectures and Compilation Techniques, IEEE, Oct 1966, pp. 174–178.

Hensgen et al., MINTABS: Early experiences witha new paradigm for programming SIMD computers, Proc. on Distributed Computing Systems, IEEE, 1992, pp. 110–117.

Yoshida et al., "A Data–localization Scheme using task–fusion for macro–dataflow computation", Proc on Comm., computers and Signal Processing, IEEE, 1995, pp. 135–140.

Garza–Salazar et al., "Reducing communication by honoring multiple alignments", Proc of the INtl Conf on Supercomputing, ACM, pp. 87–96.

Weiss, "Mining on SIMD architectures", Proc. of the Intl. Conf. on Supercomputing, ACM, 1991, page 234.

Philippsen, "Automatic alignment of array data and processes to reduce comminication time on DMPPs", ACM SIGPLAN, 1995, pp. 156–165.

Pugh, "Uniform techniques for Loop Optimization", Proc. Supercomputing, ACM, 1991, pp. 25.

Gupta et al., "PARADIGM: Acompiler for automatic data distribution on multicomputers", Proc. on Supercomputing, 1993, ACM, pp. 87.

Aho et al., "Compilers Principles, Techniques, and Tools" Addison–Wesley Publishing Company pp.513–722 (1985).

Zima et al., "Supercompilers for Parallel and Vector Comuters" Addison–Wesley Publishing Company pp. 112–172 (1991).

*Primary Examiner*—Kakali Chaki
*Attorney, Agent, or Firm*—Foley & Lardner

[57] ABSTRACT

A compiler has optimization processing part which comprise a loop normalization processing part for normalizing a loop structure in an intermediate language program, a subscript expression analyzing part for analyzing the presence or not of non-aligned access in the normalized loop structure, an SIMD instruction converting part for modifying an intermediate code so to perform computing of the array elements by using an SIMD instruction sequence, and a non-aligned access processing part for recognizing parts which are not word-aligned access in the array elements on a main storage subjected to the SIMD computing and converting a part of the non-aligned access into a combination of wored-aligned access instructions and shift instructions with logical instructions.

10 Claims, 22 Drawing Sheets

FIG. 4

| | | | |
|---|---|---|---|
| 1 | | t1 ← | 0 |
| 2 | L1: | t2 ← | adrs(A) |
| 3 | | t3 ← | 2 |
| 4 | | t4 ← | t1 * t3 |
| 5 | | t5 ← | t2 + t4 |
| 6 | | t6 ← | mem16(t5) |
| 7 | | t7 ← | adrs(A) |
| 8 | | t8 ← | 2 |
| 9 | | t9 ← | t1 * t8 |
| 10 | | t10 ← | t7 + t9 |
| 11 | | t11 ← | 2 |
| 12 | | t12 ← | t10 + t11 |
| 13 | | t13 ← | mem16(t12) |
| 14 | | t14 ← | t6 - t13 |
| 15 | | t15 ← | adrs(D) |
| 16 | | t16 ← | 2 |
| 17 | | t17 ← | t1 * t16 |
| 18 | | t18 ← | t15 + t17 |
| 19 | | t19 ← | 2 |
| 20 | | t20 ← | t18 + t19 |
| 21 | | mem16(t20) ← | t14 |
| 22 | | t21 ← | 1 |
| 23 | | t1 ← | t1 + t21 |
| 24 | | t22 ← | 100 |
| 25 | | if ( t1 < t22 ) goto L1 | |

| INSTRUCTION NUMBER | COEFFICIENT Ci | COEFFICIENT Cd |
|---|---|---|
| 6 | 2 | 0 |
| 13 | 2 | 2 |
| 21 | 2 | 2 |

FIG. 8

| COEFFICIENT Cd | CONSTANT LSL | CONSTANT LSR |
|---|---|---|
| 2 | 16 | 48 |
| 4 | 32 | 32 |
| 6 | 48 | 16 |

FIG. 6

| | | | |
|---|---|---|---|
| 1 | | t1 ← | 0 |
| 2 | L1: | t2 ← | adrs(A) |
| 3 | | t3 ← | 2 |
| 4 | | t4 ← | t1 * t3 |
| 5 | | t5 ← | t2 + t4 |
| 6 | | s6 ← | mem64(t5) |
| 7 | | t7 ← | adrs(A) |
| 8 | | t8 ← | 2 |
| 9 | | t9 ← | t1 * t8 |
| 10 | | t10 ← | t7 + t9 |
| 11 | | t11 ← | 2 |
| 12 | | t12 ← | t10 + t11 |
| 13 | | s13 ← | mem64(t12) |
| 14 | | s14 ← | s6 - s13 |
| 15 | | t15 ← | adrs(D) |
| 16 | | t16 ← | 2 |
| 17 | | t17 ← | t1 * t16 |
| 18 | | t18 ← | t15 + t17 |
| 19 | | t19 ← | 2 |
| 20 | | t20 ← | t18 + t19 |
| 21 | | mem64(t20) ← | s14 |
| 22 | | t21 ← | 4 |
| 23 | | t1 ← | t1 + t21 |
| 24 | | t22 ← | 100 |
| 25 | | if ( t1 < t22 ) goto L1 | |

| | | | |
|---|---|---|---|
| 100 | t100 | ← | adrs(A) |
| 101 | t101 | ← | 2 |
| 102 | t102 | ← | t1 * t101 |
| 103 | t103 | ← | t100 + t102 |
| 104 | s104 | ← | mem64(t103) |
| 105 | t105 | ← | adrs(A) |
| 106 | t106 | ← | 2 |
| 107 | t107 | ← | t1 * t106 |
| 108 | t108 | ← | t105 + t107 |
| 109 | t109 | ← | 8 |
| 110 | t110 | ← | t108 + t109 |
| 111 | s111 | ← | mem64(t110) |
| 112 | t112 | ← | 16 |
| 113 | s113 | ← | s104 << t112 |
| 114 | t114 | ← | 48 |
| 115 | s115 | ← | s111 >> t114 |
| 116 | s116 | ← | s113 | s115 |
| 117 | s14 | ← | s6 - s116 |

| | | | |
|---|---|---|---|
| 200 | t200 | ← | adrs(D) |
| 201 | t201 | ← | 2 |
| 202 | t202 | ← | t1 * t201 |
| 203 | t203 | ← | t200 + t202 |
| 204 | s204 | ← | mem64(t203) |
| 205 | s205 | ← | 0xFFFF000000000000 |
| 206 | s206 | ← | s204 & t205 |
| 207 | t207 | ← | 16 |
| 208 | s208 | ← | s14 >> t207 |
| 209 | s209 | ← | s206 | s208 |
| 210 | t210 | ← | adrs(D) |
| 211 | t211 | ← | 2 |
| 212 | t212 | ← | t1 * t211 |
| 213 | t213 | ← | t210 + t212 |
| 214 | mem64(t213) | ← | s209 |
| 215 | t214 | ← | adrs(D) |
| 216 | t215 | ← | 2 |
| 217 | t216 | ← | t1 * t215 |
| 218 | t217 | ← | t214 + t216 |
| 219 | t218 | ← | 8 |
| 220 | t219 | ← | t217 + t218 |
| 221 | s220 | ← | mem64(t219) |
| 222 | s221 | ← | 0x0000FFFFFFFFFFFF |
| 223 | s222 | ← | s220 & t221 |
| 224 | t223 | ← | 48 |
| 225 | s224 | ← | s14 << t223 |
| 226 | s225 | ← | s222 | s224 |
| 227 | t226 | ← | adrs(D) |
| 228 | t227 | ← | 2 |
| 229 | t228 | ← | t1 * t227 |
| 230 | t229 | ← | t226 + t228 |
| 231 | t230 | ← | 8 |
| 232 | t231 | ← | t229 + t230 |
| 233 | mem64(t231) | ← | s225 |

| COEFFICIENT Cd | CONSTANT SML | CONSTANT SSL | CONSTANT SMR | CONSTANT SSR |
|---|---|---|---|---|
| 2 | 16 | 0xFFFF000000000000 | 48 | 0x0000FFFFFFFFFFFF |
| 4 | 32 | 0xFFFFFFFF00000000 | 32 | 0x00000000FFFFFFFF |
| 6 | 48 | 0xFFFFFFFFFFFF0000 | 16 | 0x000000000000FFFF |

FIG. 13

| | | | | | | | |
|---|---|---|---|---|---|---|---|
| 1 | | t1 | ← 0 | 30 | | s116 | ← s113 \| s115 |
| 2 | L1: | t2 | ← adrs(A) | 31 | | s14 | ← s6 - s116 |
| 3 | | t3 | ← 2 | 32 | | s205 | ← 0xFFFF000000000000 |
| 4 | | t4 | ← t1 * t3 | 33 | | s206 | ← s18 & t205 |
| 5 | | t5 | ← t2 + t4 | 34 | | t207 | ← 16 |
| 6 | | s6 | ← mem64(t5) | 35 | | s208 | ← s14 >> t207 |
| 7 | | t7 | ← adrs(A) | 36 | | s18 | ← s206 \| s208 |
| 8 | | t8 | ← 2 | 37 | | s221 | ← 0x0000FFFFFFFFFFFF |
| 9 | | t9 | ← t1 * t8 | 38 | | s222 | ← s25 & t221 |
| 10 | | t10 | ← t7 + t9 | 39 | | t223 | ← 48 |
| 11 | | t11 | ← 8 | 40 | | s224 | ← s14 << t223 |
| 12 | | t12 | ← t10 + t11 | 41 | | s25 | ← s222 \| s224 |
| 13 | | s13 | ← mem64(t12) | 42 | | t26 | ← adrs(D) |
| 14 | | t14 | ← adrs(D) | 43 | | t27 | ← 2 |
| 15 | | t15 | ← 2 | 44 | | t28 | ← t1 * t27 |
| 16 | | t16 | ← t1 * t15 | 45 | | t29 | ← t26 + t28 |
| 17 | | t17 | ← t14 + t16 | 46 | | mem64(t29) | ← s18 |
| 18 | | s18 | ← mem16(t17) | 47 | | t30 | ← adrs(D) |
| 19 | | t19 | ← adrs(D) | 48 | | t31 | ← 2 |
| 20 | | t20 | ← 2 | 49 | | t32 | ← t1 * t31 |
| 21 | | t21 | ← t1 + t20 | 50 | | t33 | ← t30 + t32 |
| 22 | | t22 | ← t19 + t21 | 51 | | t34 | ← 8 |
| 23 | | t23 | ← 8 | 52 | | t35 | ← t33 + t34 |
| 24 | | t24 | ← t22 + t23 | 53 | | mem64(t35) | ← s25 |
| 25 | | s25 | ← mem16(t24) | 54 | | t36 | ← 4 |
| 26 | | t112 | ← 16 | 55 | | t1 | ← t1 + t36 |
| 27 | | s113 | ← s6 << t112 | 56 | | t37 | ← 100 |
| 28 | | t114 | ← 48 | 57 | | if ( t1 < t37 ) goto L1 | |
| 29 | | s115 | ← s13 >> t114 | | | | |

| | | | | | | | |
|---|---|---|---|---|---|---|---|
| 1 | | t1 | ← | 0 | 30 | s116 | ← | s113 \| s115 |
| 2 | L1: | s6 | ← | s13 | 31 | s14 | ← | s6 - s116 |
| 7 | | t7 | ← | adrs(A) | 32 | s205 | ← | 0xFFFF000000000000 |
| 8 | | t8 | ← | 2 | 33 | s206 | ← | s18 & t205 |
| 9 | | t9 | ← | t1 * t8 | 34 | t207 | ← | 16 |
| 10 | | t10 | ← | t7 + t9 | 35 | s208 | ← | s14 >> t207 |
| 11 | | t11 | ← | 8 | 36 | s18 | ← | s206 \| s208 |
| 12 | | t12 | ← | t10 + t11 | 37 | s221 | ← | 0x0000FFFFFFFFFFFF |
| 13 | | s13 | ← | mem64(t12) | 38 | s222 | ← | s25 & t221 |
| 18 | | s18 | ← | s25 | 39 | t223 | ← | 48 |
| 19 | | t19 | ← | adrs(D) | 40 | s224 | ← | s14 << t223 |
| 20 | | t20 | ← | 2 | 41 | s25 | ← | s222 \| s224 |
| 21 | | t21 | ← | t1 + t20 | 42 | t26 | ← | adrs(D) |
| 22 | | t22 | ← | t19 + t21 | 43 | t27 | ← | 2 |
| 23 | | t23 | ← | 8 | 44 | t28 | ← | t1 * t27 |
| 24 | | t24 | ← | t22 + t23 | 45 | t29 | ← | t26 + t28 |
| 25 | | s25 | ← | mem16(t24) | 46 | mem64(t29) | ← | s18 |
| 26 | | t112 | ← | 16 | 54 | t36 | ← | 4 |
| 27 | | s113 | ← | s6 << t112 | 55 | t1 | ← | t1 + t36 |
| 28 | | t114 | ← | 48 | 56 | t37 | ← | 100 |
| 29 | | s115 | ← | s13 >> t114 | 57 | if ( t1 < t37 ) goto L1 | | |

1501

```
for ( i = 0 ; i < 100 ; ++i ) {
    C [ i ] = A [ i ] + B [ i ] ;
}
```
1901

```
for ( i = 0 ; i < 100 ; + + i ) {
    D [ i + 1 ] = A [ i ] + A [ i + 1 ] ;
}
```
2301

COMPILER FOR OPTIMIZATION IN GENERATING INSTRUCTION SEQUENCE AND COMPILING METHOD

BACKGROUNDS OF THE INVENTION

1. Field of the Invention

The invention relates to compiler for converting a source program into an object program and a method for compiling, and more particularly to a compiler for optimizing to generate an instruction sequence for general processing of each component (array element) of a plurality of array data and a method for compiling.

2. Description of the Related Art

Means for performing multimedia processing at a high speed include a computer system, which has an instruction sequence called a SIMD (Single Instruction Multiple Data Stream) instruction and a multimedia extension instruction (hereinafter simply called "SIMD instruction sequence"). The SIMD instruction sequence is a group of instructions to generally perform computing of set data (SIMD type data), which is called an SIMD type.

FIG. 17 shows a structure of SIMD data. The SIMD data has a size equal to or integral multiple of a word size. The word means a data size to be a basic unit of processing when a processor of a computer transfers data between a primary storage and a register or performs computing between the register and the primary storage. FIG. 17 shows that one SIMD data 170 comprises four SIMD element data 171, 172, 173 and 174. Generally, the SIMD data comprises two, four or eight SIMD element data. Each SIMD element data has the same size of 8 bits, 16 bits or 32 bits in general. Quantity of SIMD element data contained in one SIMD data is called an SIMD parallelism.

The SIMD instruction performs the same computing such as addition, subtraction and multiplication of each SIMD element data in the SIMD data. FIG. 18 shows, for example, operation of the SIMD instruction to perform the addition processing of the SIMD data in that each SIMD element data has a size of 16 bits and the SIMD parallelism is "4". In the drawing, a register 1801 and a register 1802 have an operand of the SIMD data. Four independent adders (ADD) 1811, 1812, 1813 and 1814 in an SIMD adder 1810 add respective SIMD element data of the operand and store the result into a register 1803 where the computed results are stored.

The SIMD instruction sequence is effective to perform the same operations on individual elements of array data on the main storage like a C program 1901 as shown in FIG. 19.

Processing according to the SIMD instruction will be described with reference to FIG. 20. A partial array 2001 of an array A placed on the main storage is read in a unit of word into the register 1801 of the computer by an ordinary load instruction. In the same manner, a partial array 2002 of an array B is also read in a unit of word into the register 1802. According to the SIMD adding instruction, the contents of the registers 1801, 1802 are added by the SIMD adder 1810, and the added result is stored into the register 1803. Then, the contents of the register 1803 are written in a unit of word onto a partial array 2003 of an array C placed on the main storage according to an ordinary store instruction.

Thus, by using the SIMD instruction sequence, the same processing can be made on a plurality of array elements by processing of one word, so that the program can be run more quickly. Here, conversion of a program having computing of respective array elements described sequentially into a program to compute the respective array elements by the SIMD instruction sequence is defined as SIMD conversion.

Processing similar to the SIMD computing is also used for a vector type supercomputer. In the supercomputer as shown in FIG. 21, partial arrays 2101, 2102 placed on the main storage are loaded into vector registers 2111, 2112 in a vector computer 2110. A vector-arithmetic unit 2120 performs computing between the vector register 2111 and the vector register 2112 and stores the computed results into a vector register 2113. Then, the contents of the vector register 2113 are written back into an array area 2103 on the main storage. For the vector supercomputer, an automatic vectorizing compiler is practically used, which finds parts executable by the vector instruction from a sequentially described program and converts the detected part into a program using the vector instruction. The automatic vectorizing compiler analyzes an array computing order in the source program to generate an object program using the vector instruction without changing the meaning that the program has.

But, the above-described automatic vectorizing compile technology cannot be adopted as it is to a compiler for performing SIMD conversion, because of a major reason that the SIMD instruction sequence has its free access to the array elements limited.

In vector processing, each array element has a word size, and transfer between the partial array 2101 and the vector register 2111 on the main storage is conducted in integral multiple of the word size. Any partial array starting from whichever element of the array arranged on the main storage can make transfer with the vector register. On the other hand, to run by the SIMD instruction sequence, a plurality of array elements is packed into one SIMD data. Data transfer between the main storage and the register is conducted in a size of SIMD data, and the main storage data area for transfer must be an area starting from a special address called a word boundary. In other words, it is not easy to transfer a partial array starting from a given element in the array between the main storage and the register. Therefore, a conventional program for a computer having the SIMD instruction sequence was described manually by the assembler with address conditions of accessing array elements taken into consideration.

To effectively develop a program for a computer having the SIMD instruction sequence, a compiler (SIMD conversion compiler) which can generate an object program efficiently using the SIMD instruction sequence is required. To build such an SIMD conversion compiler, the following two problems in connection with access to data on the main storage must be solved.

A first problem is that data placed on an area over the word boundary on the main storage cannot be computed by the SIMD instruction sequence alone.

A second problem is that when access is made to the main storage data containing data over a word boundary, the number of access to the main storage data increases.

Such problems will be described below in detail. It is to be understood that access (not over the word boundary) to data arranged along the word boundary is called aligned access, and access (over the word boundary) not arranged along the word boundary as a non-aligned access.

The first problem will be described first. This problem causes a problem that when a certain loop structure in a program has a non-aligned access part, the pertinent part can not be subjected to SIMD conversion, and the generated object program has a degraded executing performance.

Differences between the aligned access and the non-aligned access will be described with reference to FIG. 22.

In the drawing, one word is 32 bits (4 bytes), transfer between the main storage and the register is made in a unit of two words (64 bits), the word boundary is at a position that a byte address on the main storage is an integral multiple of 4, the array element has a size of 16 bits (2 bytes), and the address is described in hexadecimal number. When four array elements 220 through 223 starting from address 00 on the main storage are loaded into the register, data areas (those starting from address 00 to just before address 08) of these four elements are arranged along the word boundary. Therefore, this aligned access can be made by an ordinary load instruction. Meanwhile, to load four array elements 224 through 227 starting from address 0E into the register, data areas (those starting from address 0E to just before address 16) of these four elements are not arranged along the word boundary, and non-aligned access is required.

Many of computers do not have the instruction sequence for the non-aligned access. For example, processing on the four elements starting from the address 0E cannot be subjected to SIMD conversion as it is. Therefore, an applicable range for automatic SIMD conversion by the compiler is narrow, and the running performance of a generated object code is disturbed from being improved. This type of non-aligned access is required to be replaced with a set of aligned access and its accompanying several supplemental operations.

The second problem will be described. The second problem degrades the performance when access to the same region on the main storage is repeated. The number of access to the individual array element can be decreased by conventional optimizing techniques. Specifically, a value is transferred from the main storage onto the register to compute on the register, and the computed result is written back to the main storage, thereby enabling to optimize the number of access to the same region on the main storage. However, even if a subject to be computed is not in complete agreement in the source program, the same area in the main storage might be accessed to perform SIMD conversion of a program.

Referring to the C program of FIG. 23, the above problem will be described with reference to FIG. 24. When program 2301 shown in FIG. 24 which contains is run the SIMD instruction sequence, the first execution of the loop body needs the 0th element to the 3rd element of the array A and the 1st element to the 4th element of the array A. The former can be done by simply loading into a register 2401 by the aligned access. But, since the latter becomes non-aligned access, the aligned access is made by dividing into SIMD data (data held by a register 2402) containing the 1st element to the 3rd element and SIMD data (data held by a register 2403) containing the 4th element. Among them, a word containing the 0th element to the 3rd element is already accessed, and overlapped access degrades the execution performance. In other words, access to data regions such as A[0] to A[3] and A[1] to A[4] which do not agree perfectly on the source program results in causing overlapped access if conversion is made for SIMD conversion.

SUMMARY OF THE INVENTION

It is an object of the present invention to provide a compiler, which allows expanding an applicable range of an SIMD instruction sequence to a source program containing array reference resulting in non-aligned access and a method for compiling.

It is another object of the invention to provide a compiler which can improve executing performance by reducing the number of access to the main storage when an object program is executed on a target computer and a method for compiling.

According to the first aspect of the invention, a compiler for generating an object program by inputting a source program and performing syntax analysis, optimization and code generation processing, comprises optimization processing means for the optimization processing, the optimization processing means further comprising, loop normalization processing means for inputting an intermediate language program obtained by performing the syntax analysis processing of the source program and normalizing a loop structure in the intermediate language program, subscript expression analyzing means for analyzing the presence or not of non-aligned access in the loop structure normalized by the loop normalization processing means and register array subscript expression information indicating the analyzed result into a subscript expression information table, SIMD instruction converting means for inputting the intermediate language program having its loop structure normalized by the loop normalization processing means and changing an intermediate code for computing in a loop body and an intermediate code for a loop iteration control part so to perform computing of the array elements by using an SIMD instruction sequence, and non-aligned access processing means for inputting the intermediate language program having the intermediate code modified by the SIMD instruction converting means and referring to the subscript expression information stored in the subscript expression information table to recognize a part which becomes non-aligned access in the array elements on a main storage subjected to the SIMD computing, calculating a displacement of an address from a word boundary at the time of reference to the array elements, and converting the word access to the main storage area not starting from the word boundary in the loop into word access to the main storage area along the word boundary, thereby converting a part of the non-aligned access into a combination of aligned access instructions and shift instructions with logical instructions.

In the preferred construction, the subscript expression analyzing means examines the relation between a loop index variable and the array subscript expression of the array element reference in the loop body within the loop structure normalized by the loop normalization processing means to analyze the presence or not of non-aligned access.

In the preferred construction, the compiler further comprises memory access optimization processing means, which input the intermediate language program processed by the non-aligned access processing means and perform optimization processing of the intermediate code of the loop body in the loop iteration and optimization processing to bridge the loop iterations.

In the preferred construction, the subscript expression analyzing means examines the relation between a loop index variable and the array subscript expression of the array element reference in the loop body within the loop structure normalized by the loop normalization processing means to analyze the presence or not of non-aligned access, wherein which further comprises memory access optimization processing means, for inputting the intermediate language program processed by the non-aligned access processing means and performing optimization processing of the intermediate code of the loop body in the loop iteration and optimization processing to bridge the loop iterations.

According to the second aspect of the invention, a compiling method for generating an object program by inputting a source program and performing syntax analysis, optimization and code generation processing, comprising the steps of a step for the optimization processing, the step for the optimization processing comprising, a step for normalizing a loop structure in an intermediate language program by inputting the intermediate language program obtained by performing syntax analysis processing of the source program, a step for analyzing the presence or not of non-aligned access in the normalized loop structure and register array subscript expression information indicating the analyzed result into a subscript expression information table, a step for inputting the intermediate language program having its loop structure normalized and changing an intermediate code for computing in a loop body and an intermediate code for a loop iteration control part so to perform computing of the array elements by using an SIMD instruction sequence, a step for inputting the intermediate language program having the intermediate code modified and referring to the subscript expression information stored in the subscript expression information table to recognize parts which have non-aligned access to the array elements on a main storage subjected to the SIMD computing, a step for calculating address displacements from word boundaries at the time of accesses to the array elements, and a step for converting the word access to the main storage area not starting from the word boundary in the loop into word access to the main storage area along the word boundary to convert a part of the non-aligned access into a combination of aligned access instructions and shift instructions with logical instructions.

In the preferred construction, the subscript expression analyzing step examines the relation between a loop index variable and the array subscript expression of the array element reference in the loop body within the normalized loop structure to analyze the presence or not of non-aligned access.

In the preferred construction, the optimization processing step inputs the intermediate language program having the non-aligned access part converted and performs optimization processing of the intermediate code of the loop body in the loop iteration and optimization processing across the loop iterations.

According to another aspect of the invention, a computer readable memory storing a control program for controlling a compiler for generating an object program by inputting a source program and performing syntax analysis, optimization and code generation processing, wherein the control program comprising the following steps a step for the optimization processing, the step for the optimization processing comprising, a step for normalizing a loop structure in an intermediate language program by inputting the intermediate language program obtained by performing syntax analysis processing of the source program, a step for analyzing the presence or not of a non-aligned access in the normalized loop structure and register array subscript expression information indicating the analyzed result into a subscript expression information table, a step for inputting the intermediate language program having the normalized loop structure and changing an intermediate code for computing in a loop body and an intermediate code for a loop iteration control part so to perform computing of the array elements by using an SIMD instruction sequence, a step for inputting the intermediate language program having the modified intermediate code and referring to the subscript expression information cataloged in the subscript expression information table to recognize a part which becomes non-aligned access in the array elements on a main storage subjected to the SIMD computing, a step for calculating a displacement of an address from a word boundary at the time of reference to the array element, and a step for converting the word access to the main storage area not starting from the word boundary in the loop into word access to the main storage area along the word boundary to convert a part of the non-aligned access into a combination of aligned access instructions and shift instructions with logical instructions.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a diagram showing an intermediate language program having scalar optimization made on a source program as shown in FIG. 23;

FIG. 5 is a diagram showing array subscript expression information collected from the intermediate language program shown in FIG. 4;

FIG. 6 is a diagram showing an intermediate language program obtained by processing the intermediate language program shown in FIG. 4 by an SIMD instruction substitute part;

FIG. 7 is a diagram showing an intermediate language program obtained by processing the non-aligned access part in the intermediate language program shown in FIG. 6 by a non-aligned access processing part;

FIG. 8 is a diagram showing constant values used by the non-aligned access processing part in processing of a load instruction, which becomes non-aligned access;

FIG. 11 is a diagram showing another intermediate language program obtained by processing in a non-aligned access processing part of the non-aligned access part in the intermediate language program shown in FIG. 6;

FIG. 12 is a diagram showing constant values used by a non-aligned access processing part in processing of a store instruction which becomes non-aligned access;

FIG. 13 is a diagram showing an intermediate language program obtained by optimizing in loop iteration to the intermediate language program shown in FIG. 6;

FIG. 15 is a diagram showing an intermediate language program obtained by optimizing between loop iterations to the intermediate language program shown in FIG. 13;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
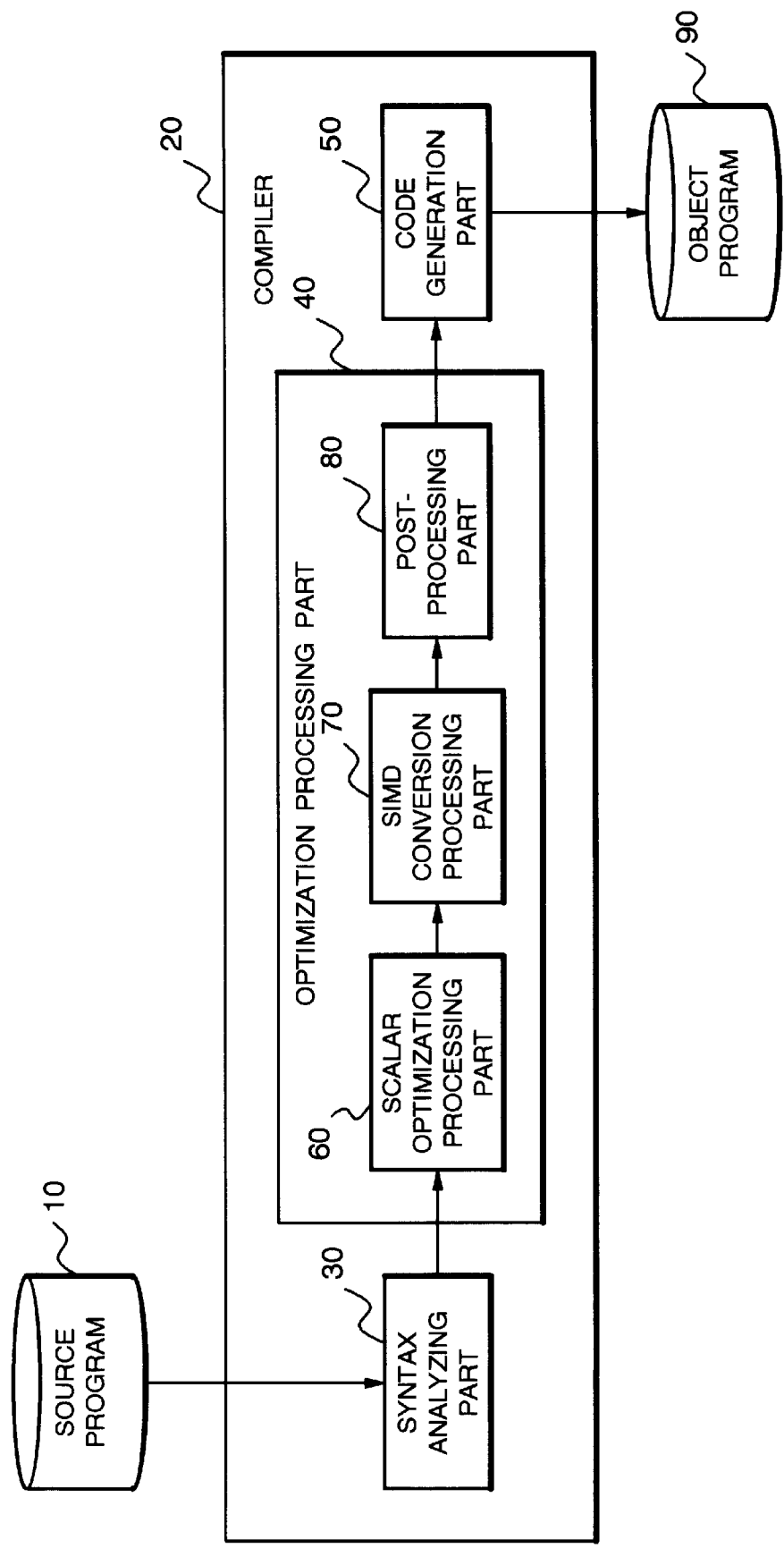
FIG. 1 is a block diagram showing a structure of the compiler according to one embodiment of the invention.
Figure 2:
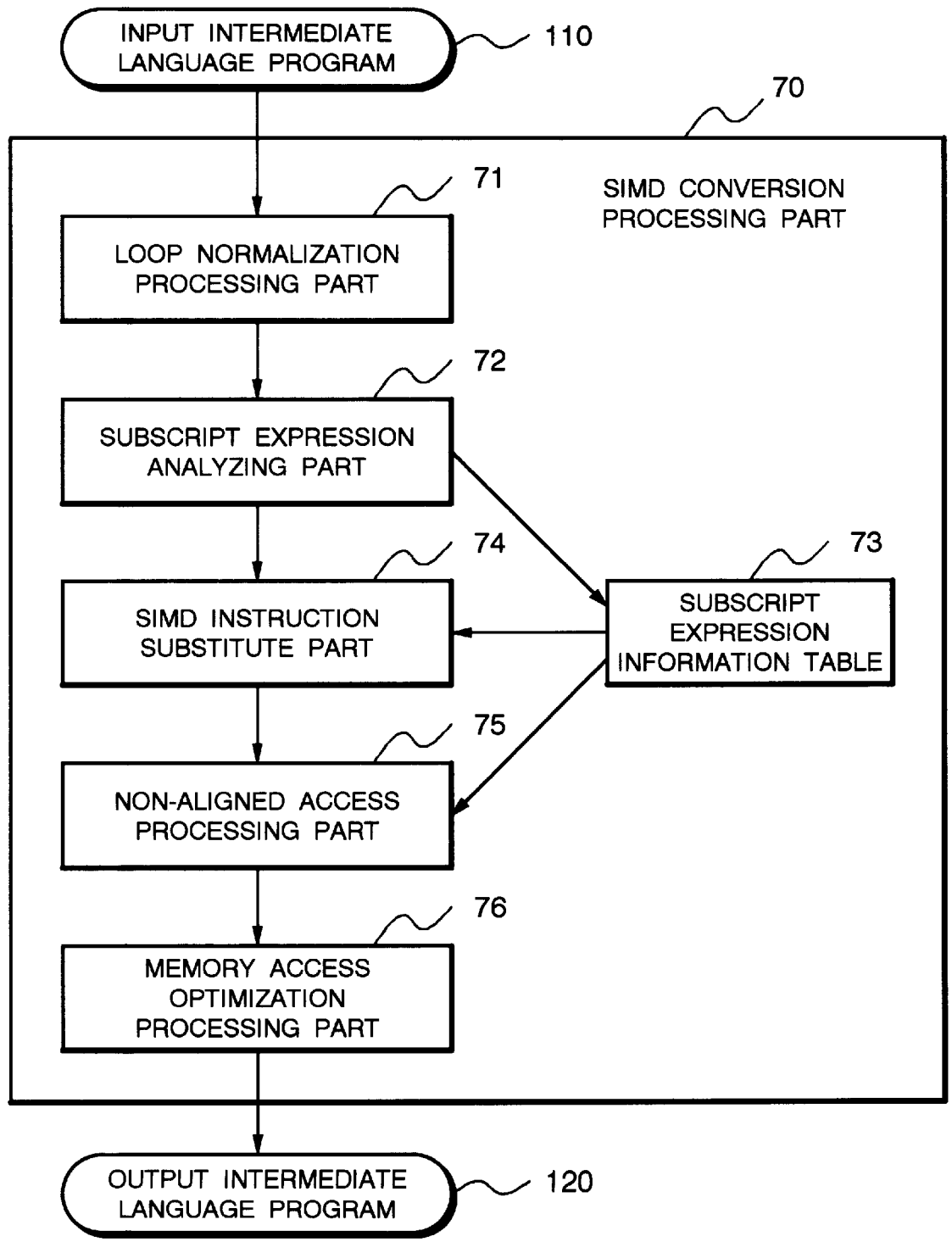
FIG. 2 is a block diagram showing a structure of an SIMD conversion processing part of the embodiment.

FIG. 1 and FIG. 2 are block diagrams showing a structure of the compiler according to one embodiment of the invention. A compiler 20 of this embodiment inputs a source program 10 which is written in a high-level language and finally converts it into an object program 90 containing an SIMD instruction sequence to output. It is to be understood that FIG. 1 and FIG. 2 show characteristic features only of this embodiment and omit other general configurations.

Referring to FIG. 1, the compiler 20 of this embodiment has a syntax analyzing part 30 which analyzes the syntax of the given source program 10 to convert into an intermediate language program (an aggregate of intermediate codes), an optimization processing part 40 which performs optimization processing including SIMD conversion of the intermediate language program, and a code generation part 50 which converts the optimized intermediate language program into the object program 90.

The optimization processing part 40 has a scalar optimization processing part 60 which applies conventional optimizing techniques such as constant propagation, copy propagation, strength reduction and removal of common expression to the intermediate language program, an SIMD conversion processing part 70 which finds parts executable by the SIMD instruction sequence in the intermediate language program and converts it into an intermediate code for the SIMD instruction sequence, and a post-processing part 80 which tries to optimize again the intermediate language program converted by SIMD conversion.

Referring to FIG. 2, the SIMD conversion processing part 70 has a loop normalization processing part 71, a subscript expression analyzing part 72, a subscript expression information table 73, an SIMD instruction substitute part 74, a non-aligned access processing part 75, and a memory access optimization processing part 76. Each component element of the SIMD conversion processing part 70 will be described.

The loop normalization processing part 71 inputs an intermediate language program 110 (hereinafter called the input intermediate language program 110) which is output from the scalar optimization processing part 60 and normalizes its loop structure. In other words, in order to facilitate the SIMD conversion processing, various types of loop structures (a loop structure in the input intermediate language program 110) are converted into a normalized loop structure.

The subscript expression analyzing part 72 examines the relation between an array subscript expression and a loop index variable in referring to the array elements in the loop body in the loop structure normalized by the loop normalization processing part 71 to analyze the presence or not of non-aligned access and registers array subscript expression information indicating the analyzed result (information indicating the presence or not of the non-aligned access) into the subscript expression information table 73.

The SIMD instruction substitute part 74 modifies the intermediate code of the computing operations in the loop body and the intermediate code of a loop iteration control part so that the array element is processed by using the SIMD instruction sequence.

The non-aligned access processing part 75 refers to the subscript expression information, which is stored in the subscript expression information table 73, to recognize a portion to be non-aligned access among the array elements on the main storage subjected to the SIMD computing, and calculates a displacement from the word boundary of address when the array elements are accessed. And, the word access to the main storage area not starting from the word boundary while looping is converted into word access to the main storage area along the word boundary, and a portion of the non-aligned access is converted into a combination of a group of aligned access instructions and shift instructions with logical instructions.

The memory access optimization processing part 76, in order to reduce the number of access to the main storage area, performs optimization processing of the intermediate code of the loop body in the loop iteration and between the loop iterations and outputs an intermediate language program 120 (hereinafter referred to as the output intermediate language program 120). In other words, with respect to the output result of the non-aligned access processing part 75, the definition-reference relationship to the main storage area is analyzed in the loop iteration and between the loop iterations, and the access to the same main storage area is replaced by the access to the register, thereby reducing the number of word access to the main storage area.

The memory access optimization processing part 76 is not an essential component in this embodiment (but, if the memory access optimization processing part 76 is omitted, the effect of reducing the number of access to the main storage cannot be attained). And, the analyzing method by the subscript expression analyzing part 72 is not limited to analysis based on the examination of the relation between an array subscript expression method and a loop index variable in referring to the array elements in the loop body as far as it is a method for analyzing the presence or not of the non-aligned access by examining the arrangement on the main storage while the array element data area which is referred in the pertinent loop structure is being executed.

Operation of this embodiment will be described.

First, the processing by the compiler 20 shown in FIG. 1 will be described briefly. The syntax analyzing part 30 in the compiler 20 analyzes the syntax of the given source program 10 to convert into an internal format called, the intermediate code, and gives the converted result (the intermediate language program) to the scalar optimization processing part 60 in the optimization processing part 40.

The scalar optimization processing part 60 performs optimization processing such as constant propagation, copy propagation, strength reduction and removal of common expression, excepting the SIMD conversion, on the received intermediate language program. Such various types of optimizing methods are described in, for example, "Compilers Principles, Techniques, and Tools" (A. V. Aho, et al., 1986, Addison-Wesley Publishers), Chapters 9 and 10. The scalar optimization processing part 60 gives the optimized intermediate language program (namely, the input intermediate language program 110) to the SIMD conversion processing part 70.

The SIMD conversion processing part 70 finds a loop structure, which can be subjected to the SIMD conversion, from the received intermediate language program, converts the detected loop structure into a loop structure containing the SIMD instruction sequence, and gives an intermediate language program (namely, the output intermediate language program 120) having the converted loop structure to the post-processing part 80. Operation within the SIMD conversion processing part 70 will be described afterward.

The post-processing part 80 further attempts code optimization of the intermediate language program converted by SIMD conversion and gives the processed result to the code generation part 50.

The code generation part 50, based on information on a target computer to be processed, converts and outputs the given intermediate language program into the object program 90 which is an aggregate of instruction arrays of the target computer.

Figure 3A:
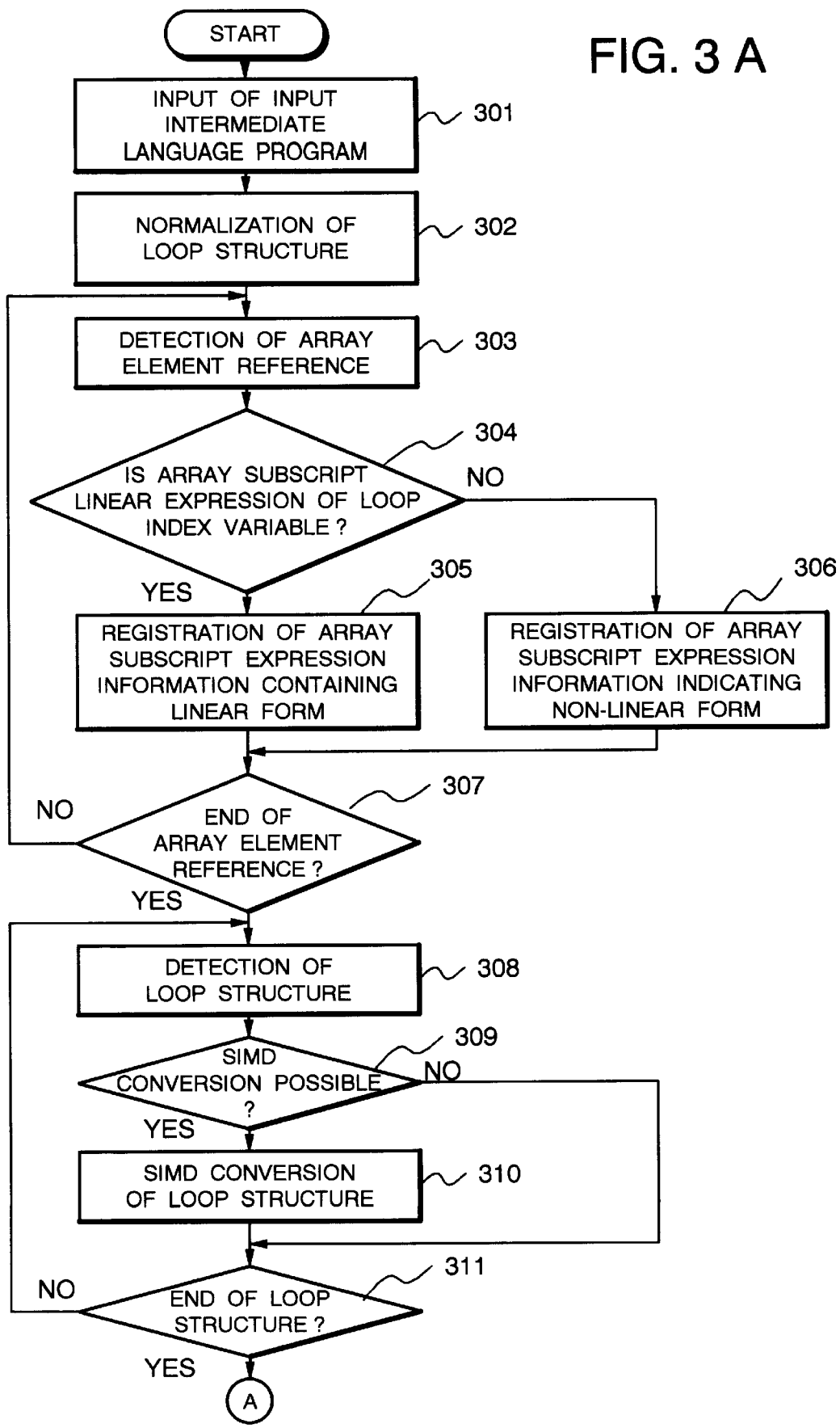
FIGS. 3A and 3B are flowcharts showing the operation of an SIMD conversion processing part of the embodiment.
Figure 3:
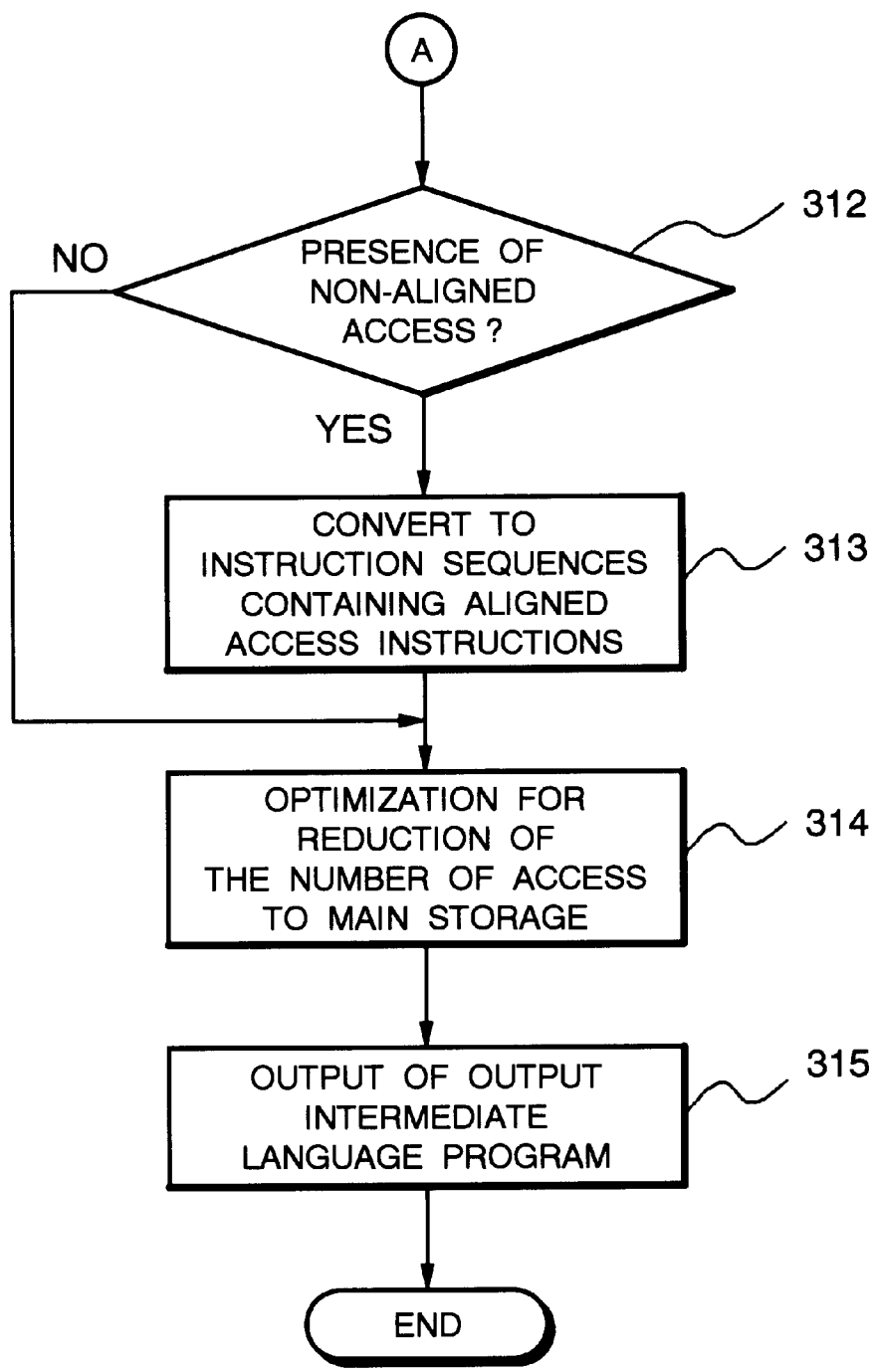

Now, referring to FIG. 2 and FIGS. 3A–3B, operation within the SIMD conversion processing part 70 will be described. FIGS. 3A and 3B represent a flowchart showing the operation of the SIMD conversion processing part 70. The SIMD conversion processing part 70 inputs the intermediate language program (the input intermediate language program 110) optimized excepting the SIMD conversion to execute the following processing.

First, the loop normalizing part 71 inputs the input intermediate language program 110 (step 301) to normalize each loop structure therein (step 302). The normalization of the loop structure denotes processing to convert the loop structure so that the pertinent loop structure has one loop index variable, the initial value of the loop index variable is equal to "0", and an increment value of every loop repetition is equal to "1". The loop normalization processing part 71 introduces newly a variable with an initial value of "0" and an increment value of "1" to the loop structure not having a loop index variable and regards it as a loop index variable. The loop normalization processing part 71 gives the intermediate code, which has been subjected to the loop normalization processing, to the subscript expression analyzing part 72.

The subscript expression analyzing part 72 then detects parts (array element reference), which refers to the array elements, from the intermediate code group of the loop body (step 303) and examines the detected array element reference to see whether the array subscript expression can be expressed in a linear form of the loop index variable (step 304). And, if it is judged to be expressible in the linear form, array subscript expression information, which indicates a pair of the pertinent array element reference and the linear form of its subscript expression, is registered in the subscript expression information table 73 (step 305).

On the other hand, if it is judged to be inexpressible in the linear form in step 304, array subscript expression information indicating that the pertinent array reference is a nonlinear form is registered in the subscript expression information table 73 (step 306). After completing the above-described analysis processing on all of the array element reference, the subscript expression analysis part 72 gives the intermediate language program to the SIMD instruction substitute part 74 (step 307).

The SIMD instruction substitute part 74 finds first a loop structure in the received intermediate language program (step 308) and judges on the respective loop structures whether the pertinent loop structure can be converted by SIMD conversion or not (step 309). This judgment is made in the following three steps.

A first step checks a structure of pullout in partway from the loop and a control structure in the loop to judge whether all the control structures of the pertinent loop structure can be adapted to the SIMD instruction sequence. If it is unachievable, the pertinent loop structure is not converted by SIMD conversion.

A second step refers to array subscript expression information, which is stored in the subscript expression information table 73, to judge whether all the subscript expressions referring to each array element in the loop body is expressed in a linear form of the loop index variable. If the nonlinear form were contained, the pertinent loop is not converted by SIMD conversion. And, even if expressed in the linear form, when a coefficient for the loop index variable is other than 1, it is examined whether or not adaptable to the SIMD instruction sequence provided in the target computer. If not adaptable in the examination, the pertinent loop structure is not converted by SIMD conversion.

A third step analyzes the relation between the definition of scalar variables and array variables in the loop and the reference to examine whether the executed result of the program is changed as a result of changes in definition and reference order of the variables due to SIMD conversion. A conventional method called, data dependence analysis, can be used for this examination. Such a data dependence analysis method is described in, for example, "Supercompilers for Parallel and Vector Computers" (H. Zima, et al., 1991, Addison-Wesley Publishing Company), Chapter 4. When the data dependence analysis results in finding that the executed result of the program would be changed, the pertinent loop structure is not converted by SIMD conversion.

The SIMD instruction substitute part 74 of the subject loop structure meets all the conditions of the above three steps and judges that the pertinent loop structure can be converted by SIMD conversion. And, each loop structure, which was judged to be able to be converted by SIMD conversion, has the intermediate code changed so that the loop is deployed for SIMD parallelism, and the array element for the SIMD parallelism is processed using the SIMD instruction sequence in the loop body (step 310). And, after completing step 308 to step 310 on all the loop structures, the SIMD instruction substitute part 74 gives the intermediate language program having the loop structure converted by SIMD conversion to the non-aligned access processing part 75 (step 311).

The non-align access processing part 75 scans the individual loop structure converted by SIMD conversio to examine whether access to the array elements by the SIMD instruction sequence has become word-aligned (whether the non-aligned access is present or not) (step 312). Judgment whether the given array element access is word-aligned or not is made based on the array subscript expression information stored in the subscript expression information table 73 as well as the arrangement of the entire array on the main storage, array element size and the word size of the target computer.

If it is judged that the non-aligned access is present, the non-aligned access processing part 75 replaces the pertinent non-aligned access instruction within the intermediate code with a series of instruction arrays consisting of aligned access instructions to two adjacent words containing an array element group to be referred to and shift instructions and logical operation instructions (step 313). As a result, all the array element access in the loop structure converted by SIMD conversion become word-aligned.

The non-align access processing part 75 then gives the intermediate language program through the processing in step 313 or the intermediate language program which was judged not having a non-aligned access in step 312 and not processed in step 313 to the memory access optimization processing part 76.

The memory access optimization processing part 76 scans the individual loop structure converted by SIMD conversion and optimizes the intermediate code so to reduce the number of access to the main storage involved in the array element access in the loop body (step 314). Specifically, when the same word in the main storage is accessed within the loop iteration and between the loop iterations, the intermediate code of the loop structure is changed so that a register for holding the word is secured and accessed instead of the access to the word on the main storage.

Finally, the memory access optimization processing part 76 outputs the intermediate language program which have been subjected to the processing described above, namely the output intermediate language program 120 (step 315).

The compiler of the embodiment described above is achieved in a workstation, a personal computer and other computer systems. The SIMD conversion processing part 70 in the optimization processing part 40 of this embodiment is achieved by a data program-controlled processing apparatus 102, which is mounted on the computer system. The control program for controlling the data processing apparatus 102 is provided in the form installed in a storage medium 101 as shown in the drawing. The storage medium 101 can be a magnetic disk, an optical disk, a semiconductor memory and another ordinary recording medium.

This control program is read from the recording medium 101 into the data processing apparatus 102 to control the operation of the data processing apparatus 102. The data processing apparatus 102 under control by the pertinent program executes the input intermediate language program 110 to conduct processing (processing achieved by the loop normalization processing part 71, the subscript expression analyzing part 72, the subscript expression information table 73, the SIMD instruction substitute part 74, the non-aligned access processing part 75 and the memory access optimization processing part 76) by the SIMD conversion processing part 70 described in the first embodiment to output the output intermediate language program 120.

Figures 22, 23:
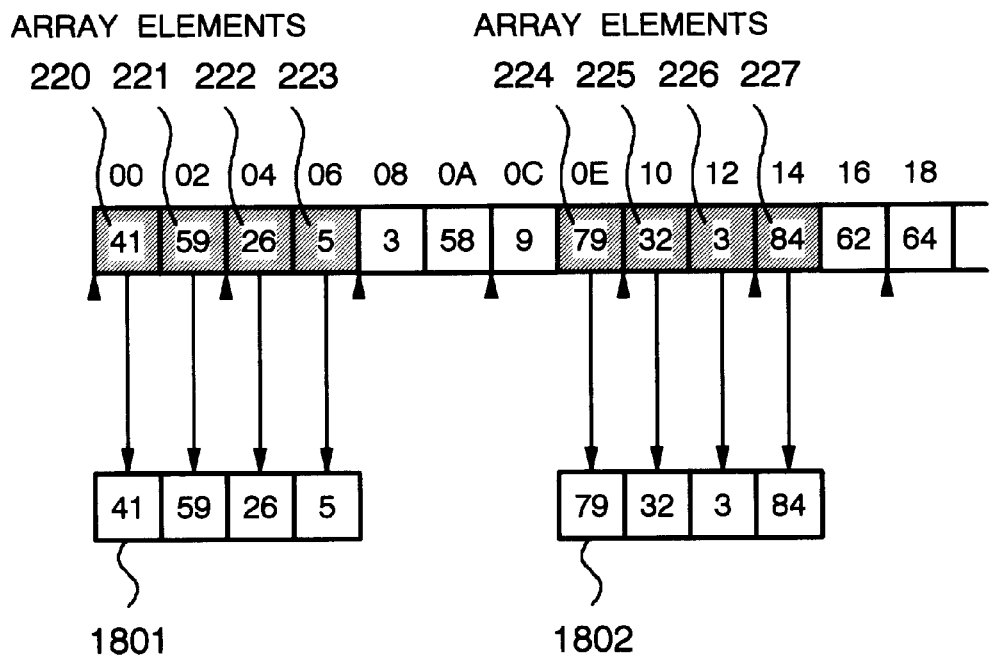
FIG. 22 is a diagram for describing the contents of non-aligned access.
FIG. 23 is a diagram showing an example of a source program for computing including non-aligned access.
Figure 24:
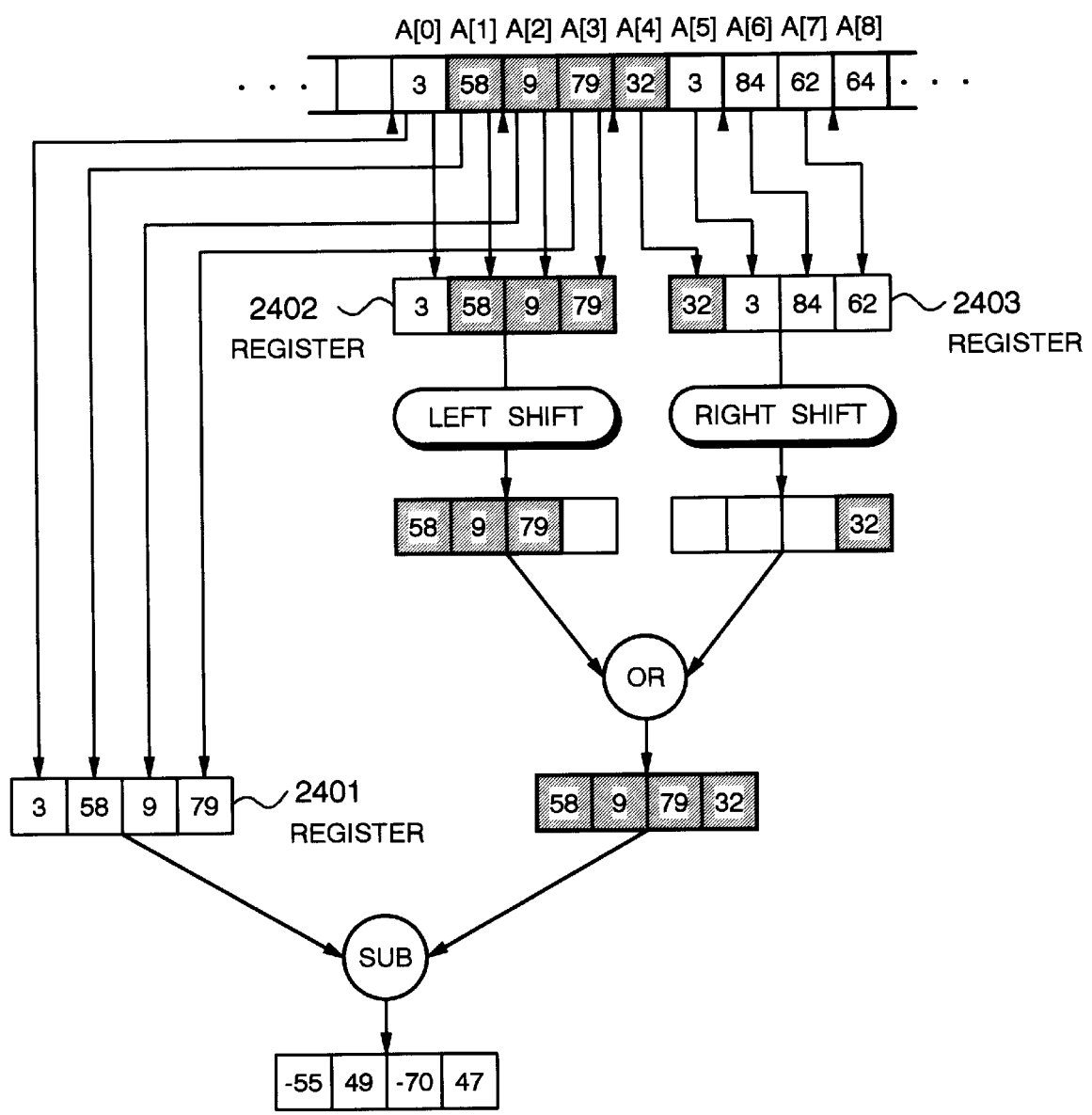
FIG. 24 is a diagram showing processing of aligned access on data over a word boundary.

Now, referring to a specific example of converting a program, the operation of the compiler of the above-described embodiment will be described in detail. The C program 2301 shown in FIG. 23 is used as the source program 10 in the description.

The syntax analysis processing by the syntax analyzing part 30 and the scalar optimization processing by the scalar optimization processing part 60 in the optimization processing part 40 are executed on the C program 2301 to obtain an intermediate language program 401 (=the input intermediate language program 110) as shown in FIG. 4. In the intermediate language program 401, $t_n$ (n=positive integer) is a temporary term, adrs(A) is a storing address of array variable A, mem16($t_n$) is a content of a 16-bit data area on the main storage with the temporary term $t_n$ as the start address, and if-goto is a conditional branch instruction which transfers control of execution to the designated label only when the condition expression has a value of true. In FIG. 4, the temporary term $t_1$ is used as a loop index variable. Moreover, number in the first column is an instruction number given to each instruction of the intermediate code used for description.

The intermediate language program 401 input into the SIMD conversion processing part 70, which has been subjected to the processing by the loop normalization processing part 71, has array subscript expression information extracted by the subscript expression analyzing part 72 as shown in FIG. 5 and registered in the subscript expression information table 73. Instruction numbers in FIG. 5 correspond to array element reference instructions in the intermediate language program 401, and coefficient Ci and coefficient Cd are a coefficient to a loop index variable and a value (unit: byte) of the constant term when the array subscript expression is expressed in the linear form of the loop index variable.

The subscript expression information table 73 in this embodiment collects not the array subscript expression described in the source program but array subscript expression information based on an address expression, namely effective address, for making access to the array elements on the intermediate code. For example, an effective address of the array element reference corresponding to instruction number 6 in the intermediate language program 401 is adrs(A)+$t_1$*2, in which adrs(A) is the storing address of the array, and $t_1$*2 is a displacement from the storing address. Then, $t_1$*2 is regarded as array subscript expression information, "2" is registered as a value of coefficient Ci, and "0" is registered as a value of coefficient Cd. Similarly, an effective address of the array element reference to instruction number 13 is adrs(A)+$t_1$*2+2, in which $t_1$*2+2 is a displacement from the array storing address, so that array subscript expression information with coefficient Ci=2 and coefficient Cd=2 is registered in the subscript expression information table 73.

Then, SIMD conversion processing is performed on the intermediate code given by the SIMD instruction substitute part 74 to generate an intermediate language program 601 converted by SIMD conversion as shown in FIG. 6. In the drawing, $s_6$, $s_{13}$ and $s_{14}$ are temporary terms of SIMD data type. And, the SIMD element data type is 16-bit long, SIMD parallelism is "4", and four times of loop iteration in the intermediate code before SIMD conversion is executed by one time of loop iteration after SIMD conversion.

The intermediate language program 601 generated by the SIMD instruction substitute part 74 is then processed by the non-aligned access processing part 75. First, a non-aligned access instruction in the loop body is retrieved on the intermediate language program 601. Whether or not the individual array element access is word-aligned is judged by examining the array subscript expression information which is stored in the subscript expression information table 73.

The storing address in an area where the array variables are allocated on the main storage is generally along the word boundary. Therefore, when a displacement from the array storing address is a multiple of the word size, namely a multiple of 4, the array element access is then word-aligned. Referring to the subscript expression information table 73 shown in FIG. 5, it is seen that the array element reference to instruction number 6 has coefficient Cd of "0", and this array element access is word-aligned. Meanwhile, the array element reference to instruction number 13 has coefficient Cd of "2", and it is judged that this array element access is not word-aligned.

The non-aligned access processing part 75 replaces the intermediate code of the individual array element access which turned out no to be word-aligned with the intermediate code combining the aligned access to the main storage and shift instructions with logical instructions. The intermediate code to be replaced has a different form depending on whether the non-aligned access is load or store. In the case of FIG. 6, parts ranging from instruction number 7 to instruction number 13 in the intermediate language program 601 correspond to load from the main storage which is not word-aligned.

In such a case, the pertinent parts (parts from instruction number 7 to instruction number 13) in the intermediate language program 601 are replaced with those from instruction number 100 to instruction number 117 in an intermediate language program 701 shown in FIG. 7. If the value of coefficient Cd is different from above, replacement to the same intermediate code as described above can be made by appropriately selecting the constant values (these are determined as constant LSL and constant LSR) of instruction number 112 and instruction number 114 in the intermediate language program 701. FIG. 8 shows the relation between the values of coefficient Cd and constants LSL, LSR.

On the other hand, when storing into the main storage is not word-aligned, replacement to the intermediate code is performed so that two adjacent words are loaded along the word boundary from the main storage, subjected to the storing processing and stored again along the word boundary into the main storage. For example, parts ranging from instruction number 15 to instruction number 21 in the intermediate language program 601 can be replaced with those from instruction number 200 to instruction number 233 of an intermediate language program 1101 shown in FIG. 11. In FIG. 11, the values of constants (these are determined to be constants SML, SSL, SMR and SSR in this order) used for instruction numbers 205, 207, 222 and 224 are determined as shown in FIG. 12 according to the value of coefficient Cd of the array subscript expression information to the store instruction which is not word-aligned.

As described above, the intermediate language program output by the non-aligned access processing part 75 has all the array element references within the loop structure converted by SIMD conversion replaced with the word-aligned.

Then, optimization processing for reducing the number of access to the main storage is performed by the memory access optimization processing part 76. This processing is performed in two steps, namely optimization within the loop iteration and optimization across the loop iterations.

Figure 9:
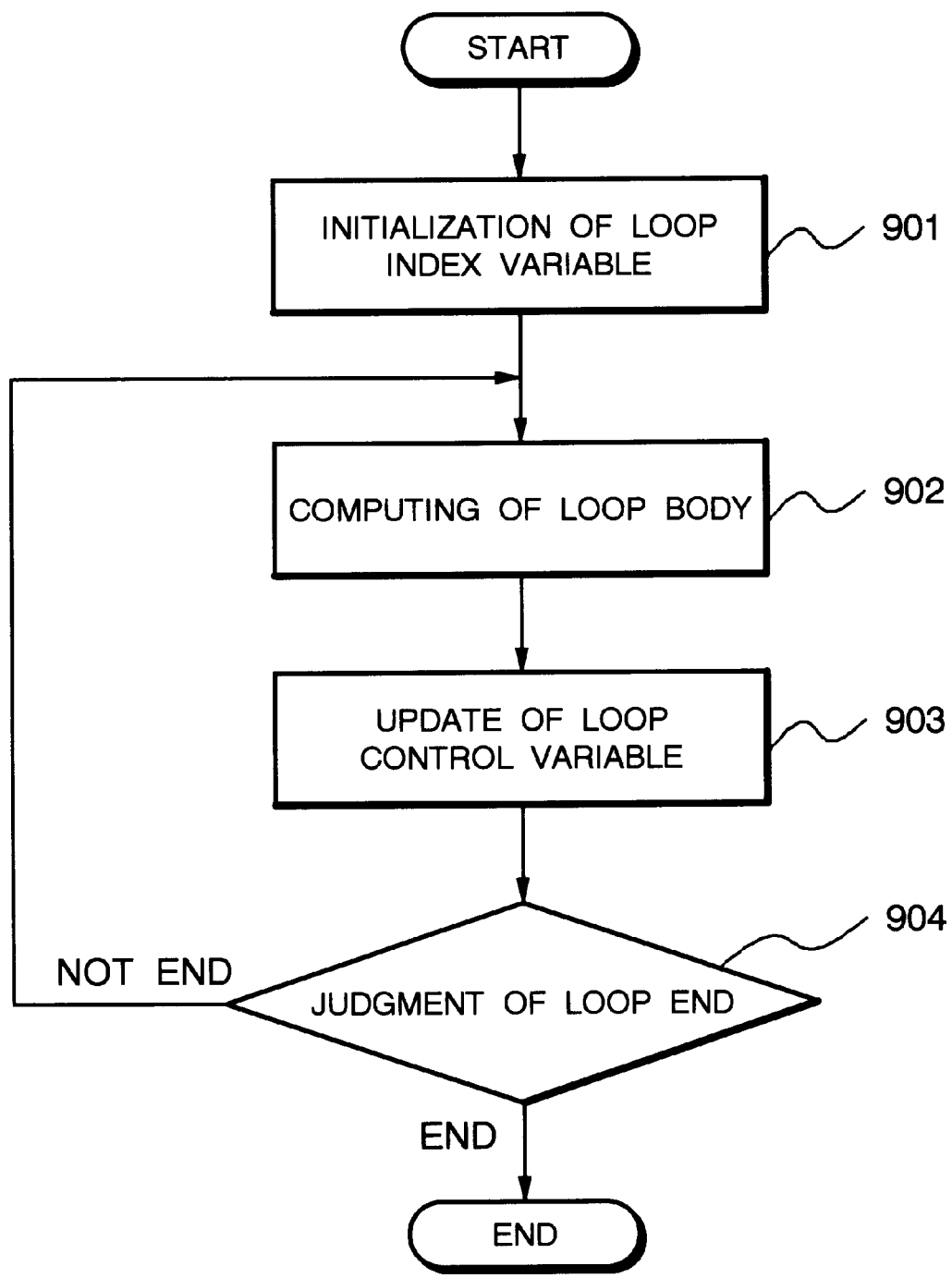
FIG. 9 is a flowchart showing processing contents of the loop structure prior to optimizing of loop iteration.
Figure 10:
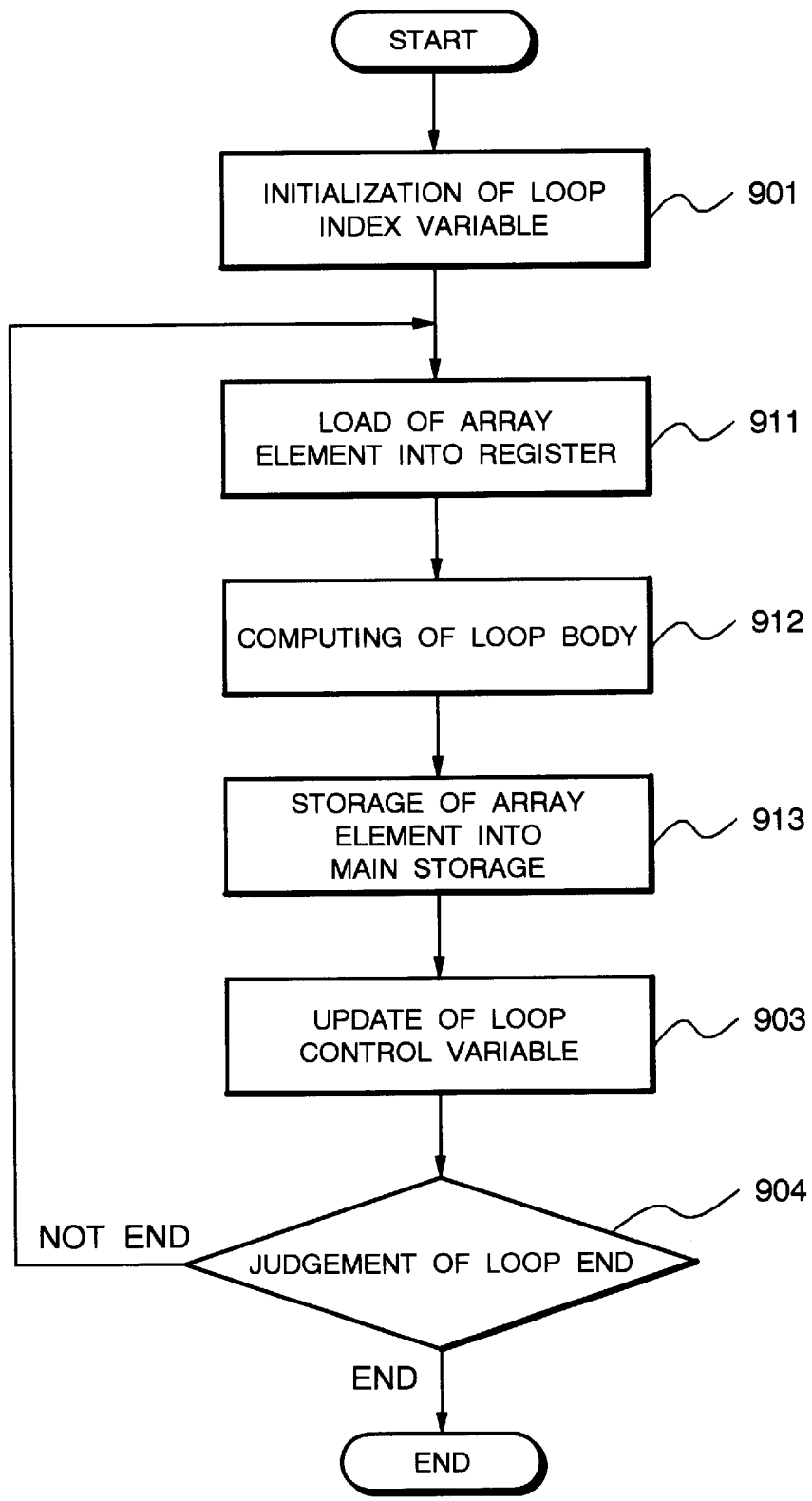
FIG. 10 is a flowchart showing processing contents of the loop structure after optimization in loop iteration.

The optimization within the loop iteration optimizes a data flow concerning the main storage access within the loop body. FIG. 9 shows a flowchart of the loop before optimizing within the loop iteration. Referring to FIG. 9, the aligned access to the main storage is performed in step 902 "for computing of the loop body". The optimization within the loop iteration is performed with step 902 "for computing of the loop body" divided into load-store processing and computing operations on the registers. Namely, the intermediate code is converted to form a loop as shown in the flowchart of FIG. 10. In the process shown in FIG. 10, the word on the main storage to be accessed first in the loop iteration is loaded into the register (step 911). In the loop, access is made to the pertinent register instead of the main storage word (step 912). And, at the end of the loop iteration, the content of the register is stored into the main storage (step 913).

Then, needless main storage accesses, for example, store instructions at the end of the loop iteration which are merely loaded and not stored, and load instructions at the beginning of the loop iteration which are merely stored and not loaded, are deleted. Optimization in the loop iteration performed on the intermediate language programs shown in FIG. 6, FIG. 7 and FIG. 11 results in an intermediate language program 1301 as shown in FIG. 13. As a result of the optimization in the loop iteration, word-aligned to the main storage is collected on the beginning and end of the loop body.

In optimization across the loop iterations, the main storage word defined and referred to in the loop body and information on its subscript expression are collected. Then, the intermediate code is modified so that the value once loaded onto the register is transferred across the loop iterations so to be used again. This process will be described in further detail.

Figure 14:
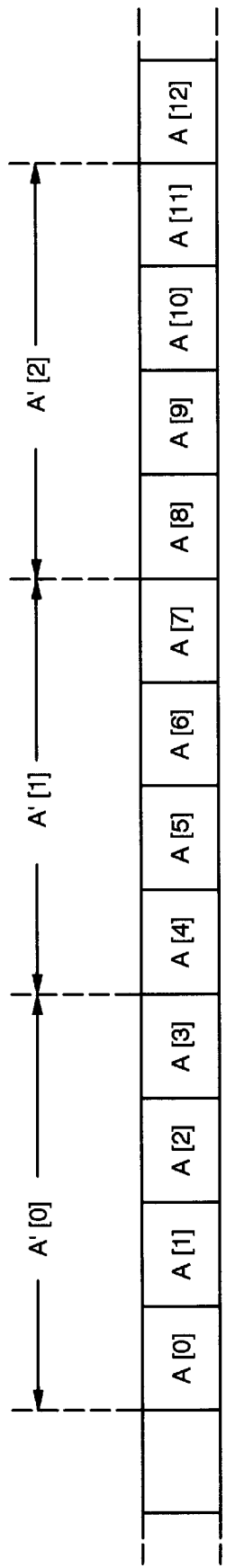
FIG. 14 is a diagram showing the relation between array data and SIMD data arranged on the main storage.
Figure 16:
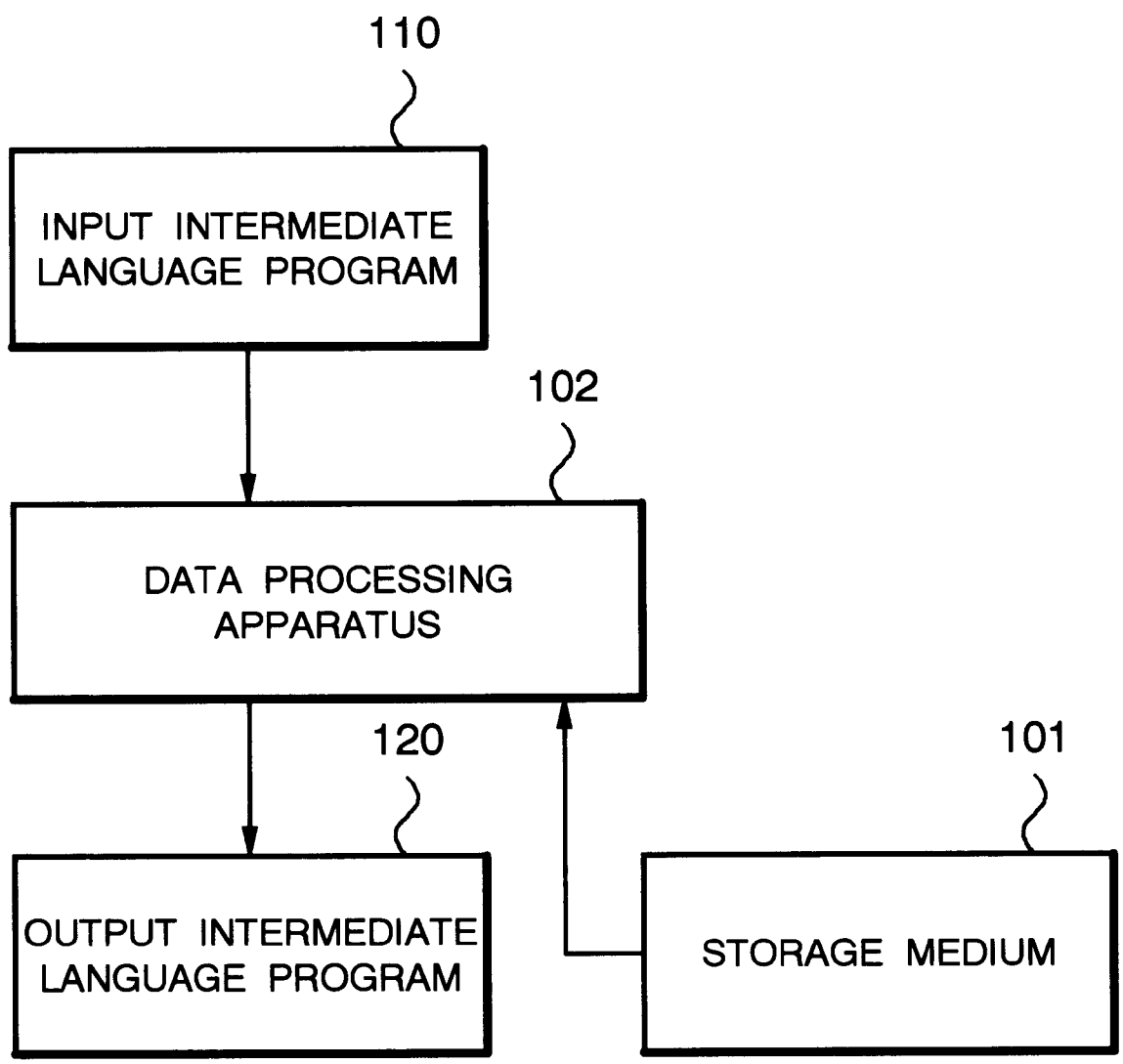
FIG. 16 is a block diagram showing a structure example for achieving the SIMD conversion processing part of the embodiment.
Figures 17, 19:
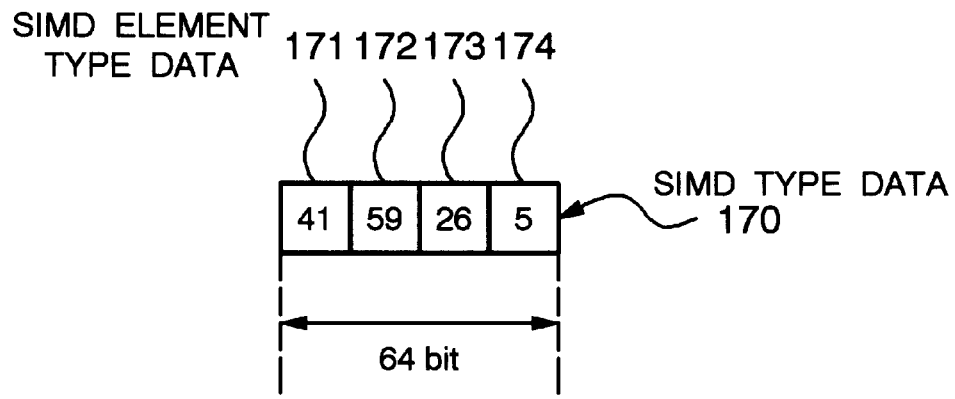
FIG. 17 is a diagram showing a structure of SIMD data.
FIG. 19 is a diagram showing an example of the source program for performing aligned access only.
Figure 18:
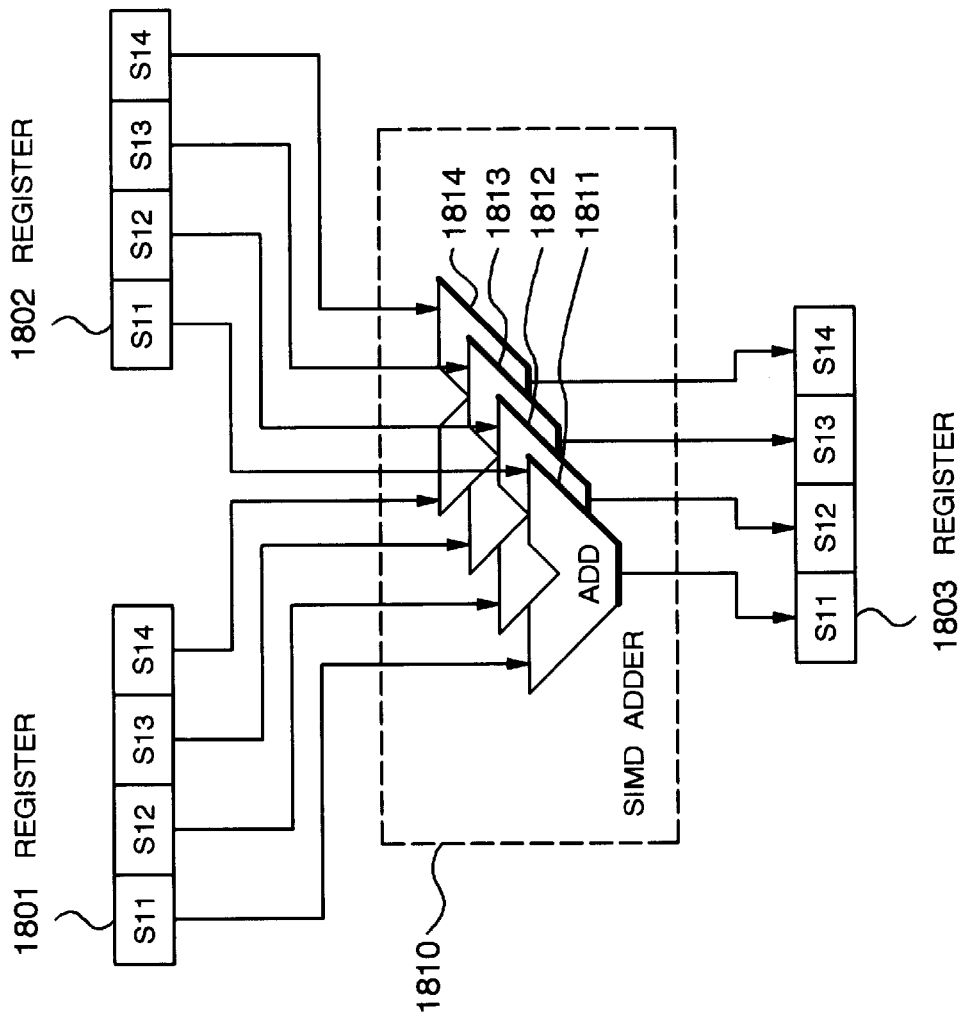
FIG. 18 is a diagram showing adding operation on SIMD data.
Figure 20:
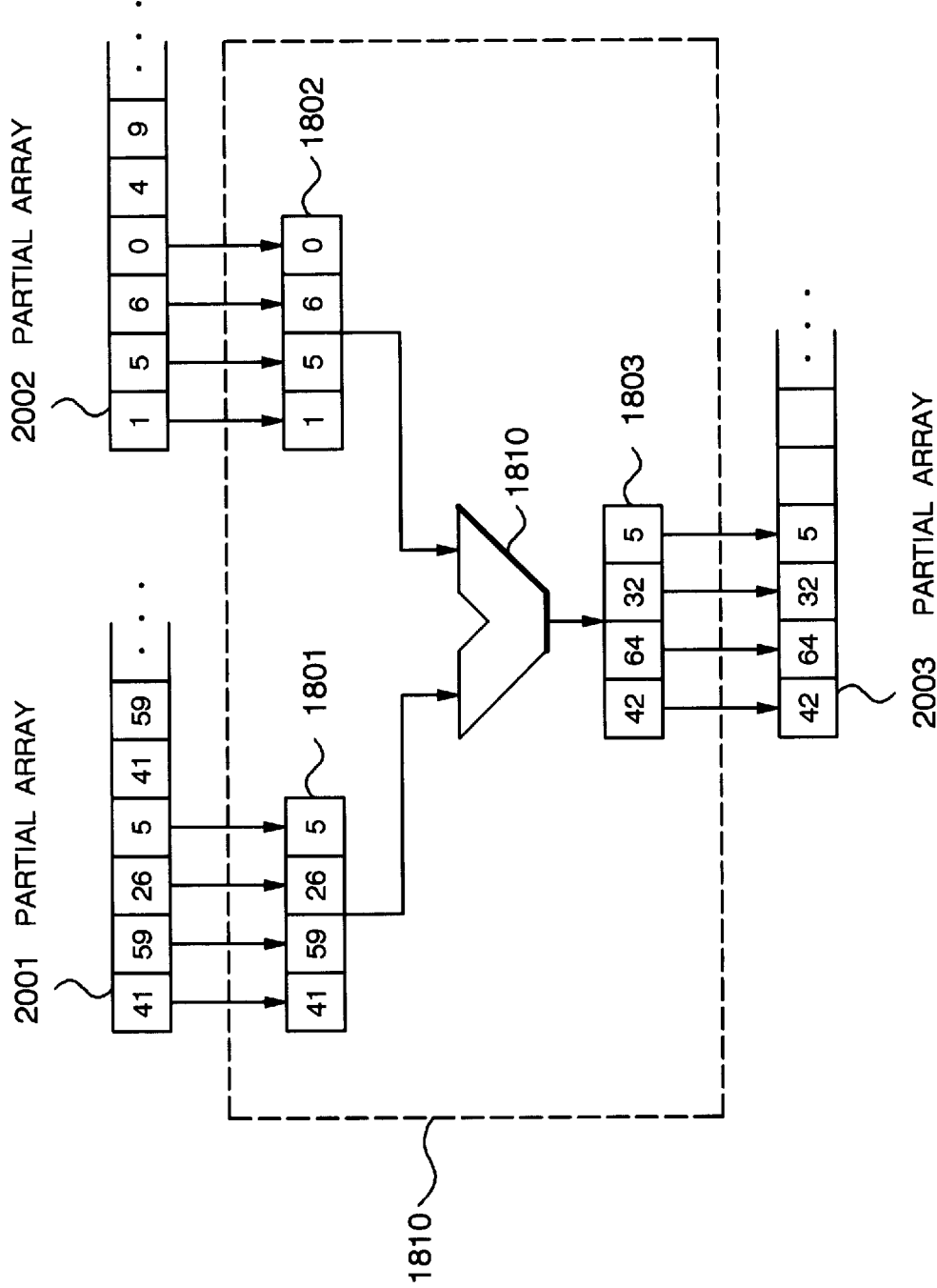
FIG. 20 is a diagram showing a data flow in aligned access.
Figure 21:
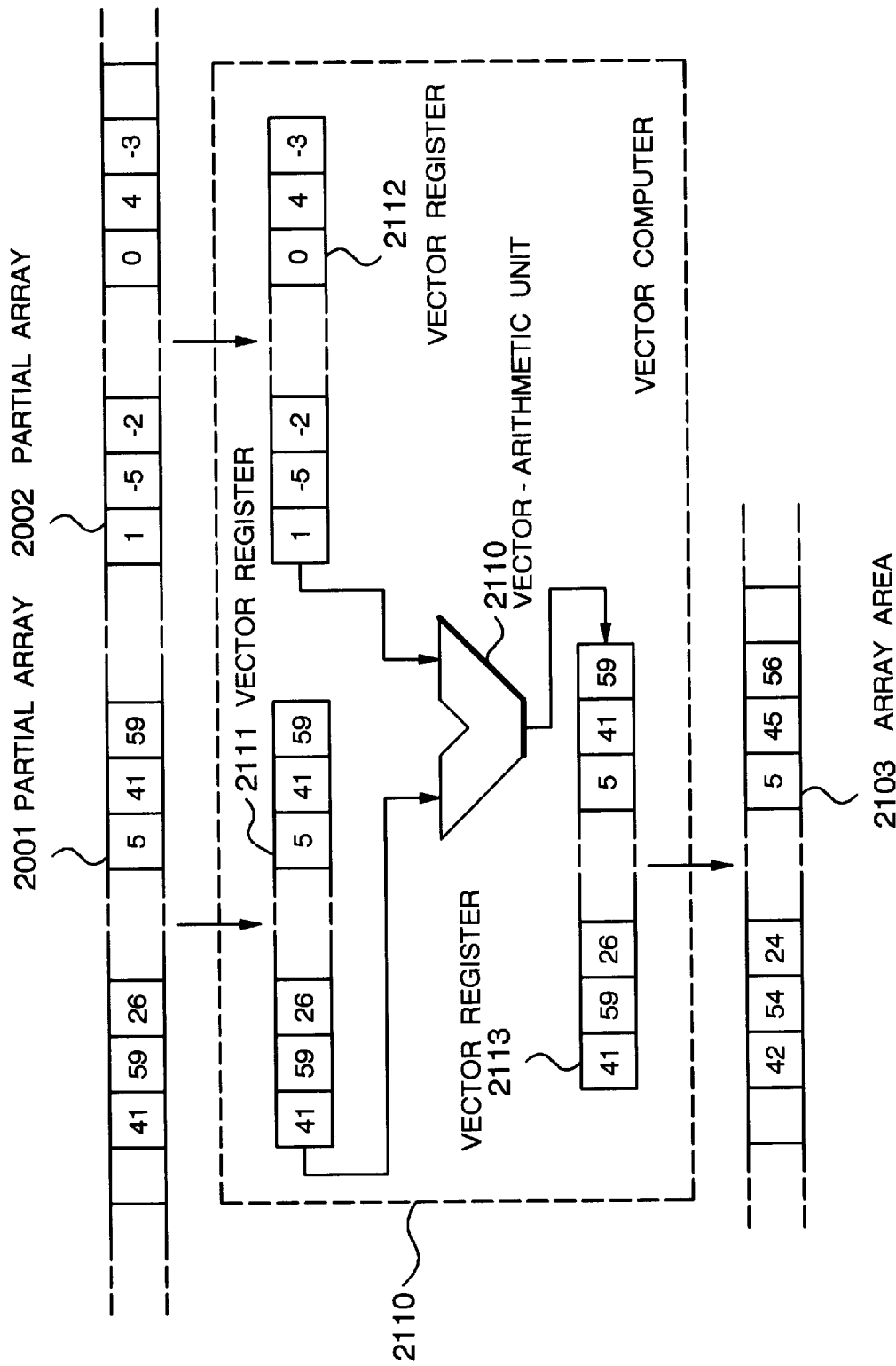
FIG. 21 is a diagram showing a data flow in vector processing.

It is assumed that access to the array A in the loop is optimized. When it is assumed that the SIMD element data type has a size of 16 bits and the SIMD data type has a size of 64 bits. Then, the array A is arranged as shown in FIG. 14, wherein four elements are grouped like A[0] to A[3], A[4] to A[7] and A[8] to A[11] and loaded and stored between the main storage and the register.

Then, it is assumed that an array A' with the element size of 64 bits is present on the same main storage area as the array A, and parts corresponding to A[0] to A[3], A[4] to A[7] and A[8] to A[11] are determined to be A'[0], A'[1] and A'[2] in this order. Then, in the loop converted by SIMD conversion, it can be assumed that the elements of the array A' are sequentially accessed in each loop iteration.

When the definition-reference relationship of the elements of the array A' in the loop body is examined and the execution of the J-th loop iteration is completed, temporary item $s_n'$ holding the latest value of A'[J+n] is obtained, in which n is an integer. And, under the condition that the temporary term $s_n'$ holds a value of A'[J+n−1] at the first of the loop iteration, the main storage access in the loop iteration is optimized once again. Besides, when reference and definition of A'[J+n] and definition of A'[J+n+1] are in the J-th loop iteration, a value defined on A'[J+n+1] is succeeded, by the temporary item, to A'[J+n] in the next loop iteration, so that the definition of A'[J+n+1] is deleted.

FIG. 15 shows the results of optimization across loop iterations on an intermediate language program 1301 shown in FIG. 13.

As described above, the compiler and its compiling method according to the present invention have an effect of improving an effective speed of a program by using an SIMD conversion method even if a target computer which operates based on an object program generated by the invention does not have a non-aligned access instruction to a main storage. The reason is that it is judged whether or not an array element access in a loop to be converted by SIMD conversion is word-aligned to convert a non-aligned access instruction sequence into an appropriate word-aligned instruction sequence.

The invention also has an effect of improving an effective speed of a program by reducing the number of accesses to the main storage. This effect is especially prominent when there are many non-aligned accesses to the main storage.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A compiler for generating an object program by inputting a source program and performing syntax analysis, optimization and code generation processing, comprising:

optimization processing means for the optimization processing;

said optimization processing means further comprising,
loop normalization processing means for inputting an intermediate language program obtained by performing the syntax analysis processing of the source program and normalizing a loop structure in the intermediate language program, subscript expression analyzing means for analyzing the presence or not of non-aligned access in the loop structure normalized by said loop normalization processing means and register array subscript expression information indicating the analyzed result into a subscript expression information table, SIMD instruction converting means for inputting the intermediate language program having its loop structure normalized by said loop normalization processing means and changing an intermediate code for computing in a loop body and an intermediate code for a loop iteration control part so to perform computing of the array elements by using an SIMD instruction sequence, and non-aligned access processing means for inputting the intermediate language program having the intermediate code modified by said SIMD instruction converting means and referring to the subscript expression information stored in the subscript expression information table to recognize parts which are not word-aligned access in the array elements on a main storage subjected to the SIMD computing, calculating address displacements from word boundaries at the time of access to the array elements, and converting the word access to the main storage area not starting from the word boundary in the loop into word access to the main storage area along the word boundary, thereby converting a part of the non-aligned access into a combination of aligned access instructions and shift instructions with logical instructions.

2. The compiler as set forth in claim 1, wherein
said subscript expression analyzing means examines the relation between a loop index variable and the array subscript expression of the array element access in the loop body within the loop structure normalized by said loop normalization processing means to analyze the presence or not of non-aligned access.

3. The compiler as set forth in claim 1, further comprising
memory access optimization processing means, which input the intermediate language program processed by said non-aligned access processing means and perform optimization processing of the intermediate code of the loop body in the loop iteration and optimization processing across the loop iterations.

4. The compiler as set forth in claim 1, wherein
said subscript expression analyzing means examines the relation between a loop index variable and the array subscript expression of the array element reference in the loop body within the loop structure normalized by said loop normalization processing means to analyze the presence or not of non-aligned access,
wherein which further comprising
memory access optimization processing means, for inputting the intermediate language program processed by said non-aligned access processing means and performing optimization processing of the intermediate code of the loop body in the loop iteration and optimization processing across the loop iterations.

5. A compiling method for generating an object program by inputting a source program and performing syntax analysis, optimization and code generation processing, comprising the steps of:

a step for the optimization processing,
said step for the optimization processing comprising,
a step for normalizing a loop structure in an intermediate language program by inputting the intermediate language program obtained by performing syntax analysis processing of the source program, a step for analyzing the presence or not of non-aligned access in the normalized loop structure and register array subscript expression information indicating the analyzed result into a subscript expression information table, a step for inputting the intermediate language program having its loop structure normalized and changing an intermediate code for computing in a loop body and an intermediate code for a loop iteration control part so to perform computing of the array elements by using an SIMD instruction sequence, a step for inputting the intermediate language program having the intermediate code modified and referring to the subscript expression information stored in the subscript expression information table to recognize parts which are not word-aligned access in the array elements on a main storage subjected to the SIMD computing, a step for calculating address displacements from word boundaries at the time of access to the array elements, and a step for converting the word access to the main storage area not starting from the word boundary in the loop into word access to the main storage area along the word boundary to convert a part of the non-aligned access into a combination of aligned access instructions and shift instructions with logical instructions.

6. The compiling method as set forth in claim 5, wherein said subscript expression analyzing step examines the relation between a loop index variable and the array subscript expression of the array element access in the loop body within the normalized loop structure to analyze the presence or not of non-aligned access.

7. The compiling method as set forth in claim 5, wherein said optimization processing step inputs the intermediate language program having the non-aligned access part converted and performs optimization processing of the intermediate code of the loop body in the loop iteration and optimization processing across the loop iterations.

8. A computer readable memory storing a control program for controlling a compiler for generating an object program by inputting a source program and performing syntax analysis, optimization and code generation processing, wherein the control program comprising the following steps:

a step for the optimization processing, said step for the optimization processing comprising, a step for normalizing a loop structure in an intermediate language program by inputting the intermediate language program obtained by performing syntax analysis processing of the source program, a step for analyzing the presence or not of a non-aligned access in the normalized loop structure and register array subscript expression information indicating the analyzed result into a subscript expression information table, a step for inputting the intermediate language program having the normalized loop structure and changing an intermediate code for computing in a loop body and an intermediate code for a loop iteration control part so to perform computing of the array elements by using an SIMD instruction sequence, a step for inputting the intermediate language program having the modified intermediate code and referring to the subscript expression information stored in the subscript expression information table to recognize parts which are not word-aligned access in the array elements on a main storage subjected to the SIMD computing, a step for calculating address displacements from word boundaries at the time of access to the array element, and a step for converting the word access to the main storage area not starting from the word boundary in the loop into word access to the main storage area along the word boundary to convert a part of the non-aligned access into a combination of aligned access instructions and shift instructions with logical instructions.

9. The computer readable memory as set forth in claim 8, wherein said subscript expression analyzing step of the control program examines the relation between a loop index variable and the array subscript expression of the array element reference in the loop body within the normalized loop structure to analyze the presence or not of non-aligned access.

10. The computer readable memory as set forth in claim 8, wherein said optimization processing step of the control program inputs the intermediate language program having the converted non-aligned access part and performs optimization processing of the intermediate code of the loop body in the loop iteration and optimization processing across the loop iterations.

* * * * *